(12) United States Patent
Wirola et al.

(10) Patent No.: US 11,350,281 B2
(45) Date of Patent: *May 31, 2022

(54) IDENTIFYING POTENTIALLY MANIPULATED RADIO SIGNALS AND/OR RADIO SIGNAL PARAMETERS BASED ON RADIO MAP INFORMATION

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 2 days.

This patent is subject to a terminal disclaimer.

(21) Appl. No.: 16/723,768

(22) Filed: Dec. 20, 2019

(65) Prior Publication Data
US 2020/0205005 A1     Jun. 25, 2020

(30) Foreign Application Priority Data
Dec. 20, 2018  (EP) ...................................... 18214694

(51) Int. Cl.
*H04W 4/00*      (2018.01)
*H04W 12/12*     (2021.01)
(Continued)

(52) U.S. Cl.
CPC ........... *H04W 12/12* (2013.01); *H04W 4/029* (2018.02); *H04W 24/08* (2013.01)

(58) Field of Classification Search
CPC .......... G01S 5/02; G01S 5/021; G01S 5/0236; G01S 5/0252; G01S 5/0257;
(Continued)

(56) References Cited

U.S. PATENT DOCUMENTS 6,049,333 A    4/2000  LaJoie et al.
6,448,925 B1   9/2002  Shridhara
(Continued)

FOREIGN PATENT DOCUMENTS

CN    106597363 A    4/2017
EP    2 746 813 A1   6/2014
(Continued)

OTHER PUBLICATIONS

Wirola et al., Bandwidth and Storage Reduction of Radio Maps for Offline WLAN Positioning, IEEE, 9 pages, Oct. 2013.*
(Continued)

*Primary Examiner* — Frank Duong
(74) *Attorney, Agent, or Firm* — Alston & Bird LLP

(57) ABSTRACT

A method is disclosed that includes obtaining one or more radio signal parameters of one or more radio signals observed by a mobile device at an observation position. The method also includes obtaining or holding available radio map information representing a radio map of a predetermined environment. The radio map is indicative of an expected radio environment of the predetermined environment. The method further includes determining, at least partially based on the one or more radio signal parameters and the radio map information, whether the one or more radio signal parameters are expected or unexpected. A corresponding apparatus and a computer-readable storage medium are also disclosed.

20 Claims, 4 Drawing Sheets

(51) Int. Cl.
*H04W 4/029* (2018.01)
*H04W 24/08* (2009.01)

(58) Field of Classification Search
CPC ..... G01S 5/0284; H04W 12/12; H04W 4/029; H04W 4/80; H04W 12/104; H04W 12/122; H04W 24/08; H04W 84/12; H04L 29/06; H04L 63/1425
See application file for complete search history.

(56) References Cited

U.S. PATENT DOCUMENTS

| | | | |
|---|---|---|---|
| 6,501,956 B1 | 12/2002 | Weeren et al. | |
| 7,305,232 B2 * | 12/2007 | Ono | H04W 4/029 455/414.2 |
| 7,312,752 B2 * | 12/2007 | Smith | H04W 4/33 342/464 |
| 7,574,202 B1 | 8/2009 | Tsao et al. | |
| 7,716,740 B2 | 5/2010 | Robert et al. | |
| 7,788,382 B1 | 8/2010 | Jones et al. | |
| 7,859,462 B2 * | 12/2010 | Small | G01S 5/145 342/450 |
| 7,970,894 B1 | 6/2011 | Patwardhan | |
| 8,571,578 B1 | 10/2013 | Chen et al. | |
| 8,655,312 B2 | 2/2014 | Stahlberg et al. | |
| 8,750,267 B2 | 6/2014 | Aggarwal et al. | |
| 8,805,403 B2 | 8/2014 | Curticapean et al. | |
| 9,113,291 B2 | 8/2015 | Venkatraman et al. | |
| 9,167,386 B2 * | 10/2015 | Valaee | H04W 4/025 |
| 9,258,713 B2 | 2/2016 | Rangarajan et al. | |
| 9,301,100 B1 | 3/2016 | Jampani et al. | |
| 9,374,709 B2 | 6/2016 | Peirce et al. | |
| 9,420,430 B2 | 8/2016 | Wuoti et al. | |
| 9,466,881 B1 | 10/2016 | Berry et al. | |
| 9,503,864 B1 | 11/2016 | Chao et al. | |
| 9,544,798 B1 | 1/2017 | Ahmadzadeh et al. | |
| 9,794,753 B1 | 10/2017 | Stitt et al. | |
| 9,849,978 B1 | 12/2017 | Carmack et al. | |
| 9,867,039 B2 | 1/2018 | Wang et al. | |
| 9,886,850 B2 | 2/2018 | Benhammou | |
| 10,149,159 B1 | 12/2018 | Perfitt | |
| 10,382,890 B1 | 8/2019 | Stirling | |
| 10,511,392 B2 * | 12/2019 | Khalajmehrabadi | H04W 24/10 |
| 10,530,486 B2 | 1/2020 | Aoyama et al. | |
| 10,531,423 B1 | 1/2020 | Hassan et al. | |
| 10,841,746 B2 | 11/2020 | Eashwaramoorthy | |
| 2005/0041634 A1 | 2/2005 | Aura | |
| 2006/0240840 A1 | 10/2006 | Morgan et al. | |
| 2007/0049323 A1 | 3/2007 | Wang et al. | |
| 2009/0075630 A1 | 3/2009 | McLean | |
| 2009/0088132 A1 | 4/2009 | Politowicz | |
| 2010/0120422 A1 | 5/2010 | Cheung et al. | |
| 2011/0009132 A1 | 1/2011 | Skarby et al. | |
| 2011/0065450 A1 | 3/2011 | Kazmi | |
| 2011/0131651 A1 | 6/2011 | Shanmugavadivel et al. | |
| 2011/0154050 A1 | 6/2011 | Cordery et al. | |
| 2012/0056785 A1 | 3/2012 | Jovicic et al. | |
| 2013/0170378 A1 | 7/2013 | Ray et al. | |
| 2013/0196684 A1 | 8/2013 | Dong | |
| 2013/0252631 A1 | 9/2013 | Alizadeh-Shabdiz et al. | |
| 2013/0303185 A1 | 11/2013 | Kim et al. | |
| 2013/0310066 A1 | 11/2013 | Shu et al. | |
| 2013/0310068 A1 | 11/2013 | Fischer et al. | |
| 2013/0336138 A1 | 12/2013 | Venkatraman et al. | |
| 2014/0130155 A1 | 5/2014 | An et al. | |
| 2014/0150049 A1 | 5/2014 | Kwon et al. | |
| 2014/0256348 A1 | 9/2014 | Wirola et al. | |
| 2014/0259047 A1 | 9/2014 | Bakar et al. | |
| 2014/0344946 A1 | 11/2014 | Ward et al. | |
| 2015/0050947 A1 | 2/2015 | Wirola et al. | |
| 2015/0065166 A1 | 3/2015 | Ward et al. | |
| 2015/0172289 A1 | 6/2015 | Kwon et al. | |
| 2015/0215762 A1 | 7/2015 | Edge | |
| 2015/0226858 A1 | 8/2015 | Leibner et al. | |
| 2015/0247916 A1 | 9/2015 | Bartov et al. | |
| 2015/0257179 A1 | 9/2015 | Kim et al. | |
| 2015/0334676 A1 | 11/2015 | Hart et al. | |
| 2015/0351017 A1 | 12/2015 | Wirola et al. | |
| 2015/0381740 A1 | 12/2015 | Gwin et al. | |
| 2016/0054427 A1 | 2/2016 | Wirola et al. | |
| 2016/0066154 A1 | 3/2016 | Shin | |
| 2016/0094947 A1 | 3/2016 | Shen et al. | |
| 2016/0192136 A1 | 6/2016 | Pan et al. | |
| 2016/0260059 A1 | 9/2016 | Benjamin et al. | |
| 2016/0374046 A1 | 12/2016 | Wirola et al. | |
| 2017/0026806 A1 | 1/2017 | Jampani et al. | |
| 2017/0068902 A1 | 3/2017 | Kirshner | |
| 2017/0078851 A1 | 3/2017 | Agrawal et al. | |
| 2017/0103489 A1 | 4/2017 | Asad et al. | |
| 2017/0142684 A1 | 5/2017 | Bhatt et al. | |
| 2017/0160375 A1 | 6/2017 | Syrjarinne et al. | |
| 2017/0238146 A1 | 8/2017 | Kulig et al. | |
| 2017/0311165 A1 | 10/2017 | Kang et al. | |
| 2017/0325070 A1 | 11/2017 | Wirola et al. | |
| 2017/0343639 A1 * | 11/2017 | Ivanov | H04W 4/029 |
| 2017/0343640 A1 | 11/2017 | Khan et al. | |
| 2018/0007067 A1 | 1/2018 | Kaushik | |
| 2018/0067187 A1 | 3/2018 | Oh et al. | |
| 2018/0070239 A1 | 3/2018 | Norrman et al. | |
| 2018/0113189 A1 | 4/2018 | Khan et al. | |
| 2018/0123708 A1 | 5/2018 | Khalajmehrabadi et al. | |
| 2018/0188348 A1 | 7/2018 | Wirola et al. | |
| 2018/0219869 A1 | 8/2018 | Kumar et al. | |
| 2018/0255430 A1 | 9/2018 | Ivanov et al. | |
| 2018/0279067 A1 | 9/2018 | Ivanov et al. | |
| 2018/0332558 A1 | 11/2018 | Chan et al. | |
| 2018/0352585 A1 | 12/2018 | Yang et al. | |
| 2019/0036951 A1 | 1/2019 | Kim | |
| 2019/0150001 A1 | 5/2019 | Jen et al. | |
| 2019/0174452 A1 | 6/2019 | Lev et al. | |
| 2019/0340363 A1 | 11/2019 | Walrant | |
| 2020/0015096 A1 | 1/2020 | Wirola et al. | |
| 2020/0036590 A1 | 1/2020 | Gonzalez et al. | |
| 2020/0112570 A1 | 4/2020 | Yang et al. | |
| 2020/0200856 A1 | 6/2020 | Wirola et al. | |
| 2020/0200857 A1 | 6/2020 | Wirola et al. | |
| 2020/0200858 A1 | 6/2020 | Wirola et al. | |
| 2020/0200859 A1 | 6/2020 | Wirola et al. | |
| 2020/0200864 A1 | 6/2020 | Wirola et al. | |
| 2020/0200865 A1 | 6/2020 | Wirola et al. | |
| 2020/0204988 A1 | 6/2020 | Wirola et al. | |
| 2020/0205004 A1 | 6/2020 | Wirola et al. | |

FOREIGN PATENT DOCUMENTS

| | | | |
|---|---|---|---|
| EP | 3 076 582 A1 | 10/2016 | |
| EP | 3 410 156 A1 | 12/2018 | |
| WO | WO 2015/189161 A1 | 12/2015 | |
| WO | WO 2017/100686 A1 | 6/2017 | |

OTHER PUBLICATIONS

Final Office Action for U.S. Appl. No. 16/723,802 dated Sep. 2, 2020, 18 pages.
Notice of Allowance for U.S. Appl. No. 16/723,721 dated Nov. 16, 2020.
Notice of Allowance for U.S. Appl. No. 16/723,802 dated Nov. 6, 2020.
Non-Final Office Action for U.S. Appl. No. 16/723,451 dated Nov. 23, 2020.
Final Office Action for U.S. Appl. No. 16/723,662 dated Dec. 18, 2020.
Final Office Action for U.S. Appl. No. 16/723,572 dated Dec. 8, 2020.
Office Action for U.S. Appl. No. 16/723,662 dated Jul. 9, 2020.
Office Action for U.S. Appl. No. 16/723,572 dated Jul. 7, 2020.
Office Action for U.S. Appl. No. 16/723,721 dated Jul. 1, 2020.
Extended European Search Report for Application No. EP 18214714.0 dated Jul. 5, 2019, 6 pages.
Extended European Search Report for Application No. EP 18 21 4716 dated Jul. 5, 2019, 6 pages.

(56) References Cited

OTHER PUBLICATIONS

Extended European Search Report for Application No. EP 18 21 4721 dated Jul. 22, 2019, 7 pages.
Extended European Search Report for Application No. EP 18 21 4705 dated Jul. 15, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/721,311, filed Dec. 19, 2019; In re: Wirola et al. entitled *Enabling Flexible Provision of Signature Data of Position Data Representing an Estimated Position*.
U.S. Appl. No. 16/723,451, filed Dec. 20, 2019: In re: Wirola et al. entitled *Service for Real-Time Spoofing/Jamming/Meaconing Warning*.
U.S. Appl. No. 16/723,572, filed Dec. 20, 2019; In re: Wirola et al. entitled *Statistical Analysis of Mismatches for Spoofing Detection*.
U.S. Appl. No. 16/723,620, filed Dec. 20, 2019; In re: Wirola et al. entitled *Crowd-Sourcing of Potentially Manipulated Radio Signals and/or Radio Signal Parameters*.
U.S. Appl. No. 16/723,662, filed Dec. 20, 2019; In re: Wirola et al. entitled *Device-Centric Learning of Manipulated Positioning*.
U.S. Appl. No. 16/723,721, filed Dec. 20, 2019; In re: Wirola et al. entitled *Identifying Potentially Manipulated Radio signals and/or Radio Signal Parameters Based on a First Radio Map Information and a Second Radio Map Information*.
U.S. Appl. No. 16/723,802, filed Dec. 20, 2019; In re: Wirola et al. entitled *Identifying Potentially Manipulated Radio Signals and/or Radio Signal Parameters*.
GPS Spoofing A Growing Problem For Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https:/www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystore system | Android Developers [online] [retrieved Feb. 17, 2020]. Retrieved via the Internet: https://web.archive.org/web/20181212204557/https:developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/2017092316223/https://fi.wikipedia.org/wiki/Subscriber_Identity_Module (dated Sep. 23, 2017) 2 pages.
Extensible Authentication Protocol—Wikipedia [online] [retrieved Feb. 17, 2020]. Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3$^{rd}$ Generation Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.
Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco/com/c/en/US/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.
Advisory Action for U.S. Appl. No. 16/723,662 dated Mar. 22, 2021.
Non-Final Office Action for U.S. Appl. No. 16/723,572 dated Mar. 22, 2021.
Non-Final Office Action for U.S. Appl. No. 16/723,620 dated Mar. 25, 2021.
Office Action for U.S. Appl. No. 16/723,802 dated May 18, 2020.
Office Action for European Application No. 18214716.5 dated Feb. 5, 2021, 5 pages.
Non-Final Office Action for U.S. Appl. No. 16/723,662 dated May 7, 2021.
Final Office Action for U.S. Appl. No. 16/723,451 dated May 3, 2021.
Notice of Allowance for U.S. Appl. No. 16/723,572 dated Jul. 13, 2021.
Advisory Action for U.S. Appl. No. 16/723,451 dated Jul. 15, 2021.
Non-Final Office Action for U.S. Appl. No. 16/723,451 dated Sep. 7, 2021.
Office Action for European Application No. 18214688.6 dated Aug. 25, 2021, 4 pages.
Office Action for European Application No. 18214694.4 dated Aug. 27, 2021, 4 pages.
Final Office Action for U.S. Appl. No. 16/723,620 dated Sep. 29, 2021.
Final Office Action for U.S. Appl. No. 16/723,662 dated Oct. 15, 2021.
Office Action for European Application No. 18214718.1 dated Jul. 14, 2021, 9 pages.
Office Action for European Application No. 18214724.9 dated Jun. 30, 2021, 8 pages.
Advisory Action for U.S. Appl. No. 16/723,620 dated Dec. 10, 2021.
Advisory Action for U.S. Appl. No. 16/723,662 dated Jan. 7, 2022.
Final Office Action for U.S. Appl. No. 16/723,451 dated Jan. 24, 2022.
Non-Final Office Action for U.S. Appl. No. 16/721,311 dated Feb. 16, 2022.
Notice of Allowance for U.S. Appl. No. 16/723,620 dated Feb. 24, 2022.
Notice of Allowance for U.S. Appl. No. 16/723,662 dated Apr. 1, 2022.
Advisory Action for U.S. Appl. No. 16/723,451 dated Apr. 7, 2022.

\* cited by examiner

IDENTIFYING POTENTIALLY MANIPULATED RADIO SIGNALS AND/OR RADIO SIGNAL PARAMETERS BASED ON RADIO MAP INFORMATION

CROSS-REFERENCE TO RELATED APPLICATIONS

This application claims priority to European Application No. 18214694.4, filed Dec. 20, 2018, the entire contents of which are incorporated herein by reference.

FIELD OF THE DISCLOSURE

The invention relates to the field of non-GNSS based radio positioning and more specifically to identifying potentially manipulated radio signals and/or radio signal parameters based on radio map information.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EMBODIMENTS OF THE INVENTION

Non GNSS-based radio positioning systems (e.g. Bluetooth, WLAN and cellular based radio positioning systems) as disclosed above may be affected by manipulating radio signals that are used for positioning purposes during the positioning stage. Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic radio signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.

Jamming of radio signals may be considered to relate a deliberate attempt to disrupt detecting one or more radio signals by a mobile device, for example by transmitting radio signals and/or radio noise interfering the one or more radio signals.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

According to an exemplary aspect of the invention, a method is disclosed, wherein the method comprises:
- obtaining one or more radio signal parameters of one or more radio signals observed by a mobile device at an observation position;
- obtaining or holding available radio map information representing a radio map of a predetermined environment, wherein the radio map is indicative of an expected radio environment of the predetermined environment;
- determining, at least partially based on the one or more radio signal parameters and the radio map information, whether the one or more radio signal parameters are expected or unexpected.

The disclosed method may serve for identifying potentially manipulated radio signals and/or radio signal parameters, for example at least partially based on the radio map information.

The mobile device may be an Internet-of-Thing (IoT) device, a smart home device, a smartphone, a tablet computer, a notebook computer, a smart watch and a smart band.

The disclosed method may be performed by at least one apparatus (e.g. any one embodiment of the apparatus(es) disclosed below). For example, the disclosed method may be performed by the mobile device or by a remote device (i.e. a device different from or remote to the mobile device) like a server (e.g. a positioning server). Alternatively, the mobile device and the remote device may for example cooperate to perform the disclosed method.

For example, the disclosed method may be part of a non-GNSS based radio positioning system as disclosed above. The mobile device may be enabled for or support such a non-GNSS based radio positioning system. This may be understood to mean that the mobile device is configured to estimate (e.g. determine) or to cause estimating (e.g. determining) its position at least partially based on radio signal parameters of one or more radio signals (e.g. one or more terrestrial radio signals) obtained at this position (e.g. obtained as a scanning result of scanning for observable radio signals at this position). Estimating (e.g. determining) of a position of the mobile device at least partially based on (a) radio signal parameter(s) may be understood to mean that the estimating is performed as a function of the radio signal parameter(s).

The one or more radio signals may be terrestrial radio signals. Examples of such a terrestrial radio signal are a Bluetooth signal, a Bluetooth Low Energy (BLE) signal, a cellular network signal, an low-power wide-area network (LPWAN) signal or a Wireless Local Area Network (WLAN) signal. The Bluetooth standards are specified by the Bluetooth Special Interest Group and are presently available under www.bluetooth.com. A cellular network may for example be mobile phone network like a 2G/3G/4G/5G cellular communication network. The 2G/3G/4G/5G cellular radio communication standards are developed by the 3GPP and presently available under www.3gpp.org. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org. WLAN is for example specified by the standards of the IEEE 802.11 family (www.ieee.org).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information (e.g. an identifier) contained in the radio signal and (2) a representation (e.g. an indicator or a value) of a physical quantity (e.g. a received signal strengths) of the radio signal. Accordingly, a radio signal parameter may be determined by at least one of (1) extracting information contained in the radio signal and (2) measuring a physical quantity (e.g. a received signal strength) of the radio signal.

For example, the mobile device may scan for observable radio signals at an observation position, for example for estimating its position (e.g. based on a non-GNSS based radio positioning system as disclosed above). The one or more radio signal parameters may then be obtained as scanning result. As discussed above, a spoofing malware running on the mobile device may falsify such scanning result.

The obtained radio signal parameters may be understood to be authentic radio signal parameters (e.g. determined by the mobile device when scanning for observable radio signals at the observation position) as well as manipulated (e.g. falsified or spoofed) radio signal parameters (e.g. falsified or generated by a spoofing malware running on the mobile device). Moreover, it is to be understood that at least some of the radio signals observed by the mobile device when scanning for observable radio signals at the observation position may be manipulated (e.g. falsified or spoofed) radio signals and, thus, the authentic radio signal parameters may at least partially based on such falsified radio signals.

Obtaining radio map information may be understood to mean that radio map information is for example received (e.g by an apparatus performing the disclosed method like the mobile device) from a remote device (e.g. the positioning server). Alternatively or additionally, the radio map information may be held available (e.g by an apparatus performing the disclosed method like the mobile device or the positioning server), for example by storing the radio map information in memory means. Since such memory means are typically limited in size, it may be advantageous to hold only a part of the radio map information available, for example if it is known that this particular part of the radio information is frequently used (e.g for positioning purposes). Accordingly, obtaining or holding available radio map information may also be understood to mean that the radio map information is partially obtained and partially held available.

The radio map information represents a radio map of a predetermined environment. Therein, the predetermined environment of the radio map may for example be understood to be the area covered by the radio map. Examples of such a predetermined environment are a building and/or a complex of buildings (e.g. a shopping center, a parking garage, an airport, a company site, etc.).

As disclosed above, estimating (e.g. determining) of a position of the mobile device may be at least partially based on (a) radio signal parameter(s). It is to be understood that the estimating may further depend on the radio map information representing a radio map of a predetermined environment. For example, such a radio map may be configured to enable mobile devices to estimate their position at least partially based on this radio map when the mobile devices are located in the predetermined environment of the radio map.

An expected radio environment at a certain position may be understood to be indicative of one or more radio signals or one or more radio signal parameters of one or more radio signals that are expected to be observable (e.g. obtainable as scanning results) at this position. That the radio map is indicative of an expected radio environment of the predetermined environment may be understood to mean that the radio map is indicative of a respective expected radio environment for each of a plurality of positions (e.g. for any position or for each position of a grid of positions) within the predetermined environment. Accordingly, the radio map may be understood to be indicative of an expected radio environment of the predetermined environment if it represents, for each of a plurality of positions (e.g. for any position or for each position of a grid of positions) within the predetermined environment, one or more respective radio signals or one or more respective radio signal parameters of one or more radio signals that are expected to be observable (e.g. obtainable as scanning results) at the respective position.

To this end, the radio map may contain or represent a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building. A respective radio model for a respective radio device of the plurality of radio devices may be understood to represent at least the expected radio coverage of the respective radio device (e.g. on a certain floor of a building). For example, the radio model of such a radio device may describe the coverage area (e.g. on a certain floor of a building) within which radio signals transmitted or triggered to be transmitted by this radio device are expected to be observable. An example for such a radio model is a radio image representing an expected radio signal strength field of the radio signals transmitted or triggered to be transmitted by this radio device. The real radio coverage of such a radio positioning support device may however deviate from the expected radio coverage as described by such a radio model. As disclosed above, the radio map may be determined by the positioning server during the training stage of the non-GNSS based radio positioning system.

Determining, at least partially based on one or more radio signal parameters and radio map information, whether the one or more radio signal parameters are expected or unexpected may be understood to mean that it is determined whether the one or more radio signal parameters are expected or unexpected at least partially based on the radio map information, for example by determining whether the one or more radio signal parameters are expected or unexpected according to the expected radio environment indicated by the radio map. It is however to be understood that the determining may optionally depend on further information (e.g. further radio signal parameters, sensor information, etc.). For example, the determining may be at least a function of the one or more radio signal parameters and the radio map information and, optionally, of further information. To give a non-limiting example, if the observation position at which the one or more radio signal parameters have been obtained is known, the determining may be further based on this observation position or information representing this observation position.

The determining may be performed according to predetermined rules (e.g. a predetermined algorithm). The predetermined rules may for example represent at least one of (1) a definition when the one or more radio signal parameters are to be determined to be expected at least partially based on the radio map information (e.g. the expected radio environment of the predetermined environment indicated by the radio map represented by the radio map information) and (2) a definition when the one or more radio signal parameters are to be determined to be unexpected at least partially based on the radio map information (e.g. the expected radio environment of the predetermined environment indicated by the radio map represented by the radio map information).

For example, the one or more radio signal parameters may be defined to be unexpected if the one or more radio signals or the one or more radio signal parameters of the one or more radio signals are not expected to be observable (e.g. obtainable as scanning results) within the predetermined environment according to the expected radio environment indicated by the radio map represented by the radio map information. Otherwise, the one or more radio signal parameters may be defined to be expected.

If spoofing occurs, the one or more radio signals and/or the one or more radio signal parameters of the one or more radio signals may be not in conformity with the expected radio environment indicated by the radio map represented by the radio map information and, thus, the one or more radio signal parameters may be determined to be unexpected. For example, if a malware running on the mobile device falsifies the scanning results, a representation of a certain physical quantity of the one or more radio signals may not match the expected radio environment of the predetermined environment. Accordingly, if it is determined that the one or more radio signal parameters are unexpected, the one or more radio signals and/or the one or more radio signal parameters may be considered to be potentially manipulated. The disclosed method allows for identifying potentially manipulated radio signals and/or radio signal parameters at least partially based on radio map information and, thus, to mitigate threats associated with manipulation techniques like spoofing and jamming.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) mobile device (s), for example (a) chip(s) or chipset(s). Alternatively, the disclosed apparatus(es) may be (a) mobile device(s). The mobile device may be configured for determining its position based on a non-GNSS based radio positioning system as disclosed above, for example a Bluetooth, WLAN or cellular based radio positioning system or a combination thereof.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a positioning system is disclosed which comprises at least one of the disclosed apparatus(es) like a mobile device and/or a positioning server. Optionally, the system may further comprise one or more radio devices transmitting (e.g. broadcasting) the one or more radio signals.

As disclosed above, the mobile device may be an Internet-of-Thing (IoT) device, a smart home device, a smartphone, a tablet computer, a notebook computer, a smart watch and a smart band.

As disclosed above, the positioning server may be configured to receive a plurality of radio fingerprint observation reports during the training stage and to determine a radio map for a predetermined environment at least partially based on the plurality of radio fingerprint observation reports. The positioning server may be further configured to provide the radio map information representing a radio map to the at least one apparatus (e.g. the mobile device) to enable the apparatus to estimate (e.g. determine) its position based on radio signals observed at a certain position of the apparatus if the apparatus is located within the predetermined environment.

The positioning server may be part of a plurality of servers (e.g. forming a positioning cloud) or may be represented by such a plurality of servers (e.g. forming a positioning cloud).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for identifying potentially manipulated radio signals and/or radio signal parameters at least partially based on radio map information.

In the following, further features and embodiments of these exemplary aspects of the invention will be described.

According to an exemplary embodiment of the invention, the method further comprises:
    scanning for radio signals (e.g. the one or more radio signals) at the observation position, wherein one or more radio signal parameters are obtained as a result of the scanning at the observation position.

According to an exemplary embodiment of the invention the method further comprises at least one of:
    determining the observation position of the mobile device; or
    obtaining observation position information indicative of the observation position of the mobile device.

The observation position of the mobile device may for example be determined by a GNSS sensor of the mobile device. Accordingly, the observation position information may represent or contain GNSS coordinates representing the observation position determined by the GNSS sensor of the mobile device. As disclosed above, examples for such a GNSS are GPS or Galileo. It is however to be understood that determining the observation position is not limited to such GNSS based positioning, for example the observation position may be determined based on other positioning solutions like cellular positioning or manual user input as well.

Obtaining the observation position information may be understood to mean at least one of (1) that the observation position information is obtained as a result of determining the observation position of the mobile device and (2) that the observation position information are received, for example by an apparatus performing the disclosed method (e.g. from the mobile device).

Determining the observation position at which the mobile device observes the one or more radio signal parameters or obtaining observation position information indicative of the observation position allows to consider the observation position or the observation position information when determining whether the one or more radio signal parameters are expected or unexpected. This may for example be advantageous for mitigating threats associated with manipulation techniques like spoofing and jamming by cross-checking GNSS based and non-GNSS based radio positioning information.

According to an exemplary embodiment of the invention, the determining whether the one or more radio signal parameters are expected or unexpected comprises:
    determining whether the one or more radio signal parameters match the expected radio environment indicated by the radio map at one or more positions of the predetermined environment or at the observation position.

As disclosed above, the radio map may be indicative of a respective expected radio environment for each of a plurality of positions (e.g. for any position or for each position of a grid of positions) within the predetermined environment. Therein, an expected radio environment at a certain position may be understood to be indicative of one or more radio signals or one or more radio signal parameters of one or more radio signals that are expected to be observable (e.g. obtainable as scanning results) at this position. Accordingly, the radio map may represent, for each of a plurality of positions (e.g. for any position or for each position of a grid of positions) within the predetermined environment, one or more respective radio signals or one or more respective radio signal parameters of one or more radio signals that are expected to be observable (e.g. obtainable as scanning results) at the respective position.

The determining whether the one or more radio signal parameters match the expected radio environment indicated by the radio map at one or more positions of the predetermined environment or at the observation position may be performed according to a matching algorithm (e.g. comparing algorithm). For example, the matching algorithms may be configured to reduce the effect of uncertainties like measurements uncertainties, for example by determining that there is a match even if one or more radio signal parameters observed at the observation position and one or more radio signal parameters represented by the radio map for a certain position within the predetermined environment are not equal, but for example substantially equal or within a (e.g. predetermined) range.

For example, determining whether the one or more radio signal parameters match the expected radio environment indicated by the radio map at one or more positions of the predetermined environment may be understood to mean that it is determined whether the one or more radio signal parameters are expected to be observable (e.g. obtainable as scanning results) at at least one position within the predetermined environment according to the expected radio environment indicated by the radio map, for example by matching (e.g. determining a match or comparing) the one or more radio signals with the one or more respective radio signals or the one or more radio signal parameters represented by the radio map for each of a plurality of positions (e.g. for any position or for each position of a grid of positions) within the predetermined environment. For example, it may be determined that the one or more radio signal parameters match the expected radio environment indicated by the radio map at one or more positions of the predetermined environment if the one or more radio signal parameters match, for at least one position within the predetermined environment for which the radio map represents one or more respective radio signals or one or more respective radio signal parameters, with one or more respective radio signals or one or more respective radio signal parameters of one or more radio signals that are represented by the radio map. Otherwise, it may be determined that the one or more radio signal parameters do not match the expected radio environment at one or more positions of the predetermined environment indicated by the radio map. A position for which the radio map represents one or more radio signal parameters which are determined to match the one or more radio signals parameters (e.g. observed at the observation position) may be considered to be an estimate of the observation position (e.g. at which the one or more radio signals or the one or more radio signal parameters were observed).

Alternatively or additionally, if the observation position is known (e.g. the observation position determined and/or indicated by the observation position information as disclosed above), it may be determined whether the one or more radio signal parameters match the expected radio environment indicated by the radio map at the observation position. For example, it may be determined whether one or more estimates of the observation position received as a result of the determining as disclosed above match with the known observation position. In an alternative example, it may be determined whether the one or more radio signal parameters are expected to be observable (e.g. obtainable as scanning results) at the known observation position according to the expected radio environment indicated by the radio map, for example by matching (e.g. determining a match or comparing) the one or more radio signals with the one or more respective radio signals or the one or more radio signal parameters represented by the radio map for the observation position. In both examples, it may only be determined that the one or more radio signal parameters match the expected radio environment indicated by the radio map at the observation position if there is a match (e.g. between the known observation position and the one or more estimates of the observation position received as a result of the determining as disclosed above or between the one or more respective radio signals or the one or more radio signal parameters represented by the radio map and the one or more radio signals (e.g. observed at the observation position)). Otherwise, it may be determined that the one or more radio signal parameters do not match the expected radio environment indicated by the radio map for the known observation position of the predetermined environment.

According to an exemplary embodiment of the invention it is determined that the one or more radio signal parameters are expected, if it is determined that the one or more radio signal parameters match the expected radio environment indicated by the radio map at least at one position of the predetermined environment or at the observation position.

According to an exemplary embodiment of the invention it is determined that the one or more radio signal parameters are unexpected, if it is determined that the one or more radio signal parameters do not match the expected radio environment indicated by the radio map at any position of the predetermined environment or at the observation position.

According to an exemplary embodiment of the invention the method further comprises at least one of:
 obtaining one or more previous radio signal parameters of one or more radio signals observed by the mobile device at a previous observation position;
 determining the previous observation position of the mobile device;
 obtaining previous observation position information indicative of the previous observation position of the mobile device;
 obtaining sensor information indicating a movement of the mobile device from the previous observation position to the observation position.

It is to be understood that the previous observation position is different from the observation position and the one or more previous radio signal parameters are different from the above disclosed one or more radio signal parameters. In the following, it is thus referred to the observation position, the observation position information and the above disclosed one or more radio signal parameters as the observation position, the observation position information and the one or more radio signal parameters, whereas the previous observation position, the previous observation position information and the previous radio signal parameters are referred to as the previous observation position, the previous observation position information and the previous radio signal parameters.

The previous observation position is a position where the mobile device was located some time before it is/was located at the observation position. Accordingly, the one or more previous radio signal parameters indicative of one or more radio signals observed by the mobile device at the previous observation position are/were obtained by the mobile device before the above disclosed radio signal parameters are/were obtained by the mobile device. For example, the one or more previous radio signal parameters are/were obtained (e.g. by the mobile device) as scanning results when scanning for observable radio signals at the previous observation position.

The previous observation position of the mobile device may for example be determined by a GNSS sensor of the mobile device. Accordingly, the previous observation position information may represent or contain GNSS coordinates representing the observation position determined by the GNSS sensor of the mobile device. As disclosed above, examples for such a GNSS are GPS or Galileo. It is however to be understood that determining the previous observation position is not limited to such GNSS based positioning, for example the previous observation position may be determined based on other positioning solutions like cellular positioning or manual user input as well.

Obtaining the previous observation position information may be understood to mean at least one of (1) that the previous observation position information are/were obtained as a result of determining the previous observation position of the mobile device and (2) that the previous observation position information are/were received, for example by an apparatus performing the disclosed method (e.g. from the mobile device).

Sensor information indicating a movement of the mobile device may be any information (e.g. qualitatively or quantitatively) representing an event or change in the environment of the mobile device detected by a sensor that is indicative (e.g. characteristic) for a movement of the mobile device. An event or change in the environment of the mobile device may for example be an event associated with or a change of a physical quantity (e.g. acceleration, orientation, shock, speed, step count, etc.) that is characteristic for a movement of the mobile device.

Obtaining the sensor information may be understood to mean at least one of (1) receiving the sensor information (e.g. from the mobile device or a remote device like a sensor device, an activity tracker or a smartwatch) and (2) determining the sensor information (e.g. by detecting an event or change in the environment of the mobile device by a sensor of the mobile device).

According to an exemplary embodiment of the invention determining whether the one or more radio signal parameters are expected or unexpected is further based on at least one of the previous radio signal parameters, the previous observation position, the previous observation position information and the sensor information.

For example, the determining whether the above disclosed one or more radio signal parameters are expected or unexpected, is additionally based on at least one of the previous radio signal parameters, the previous observation position the previous observation position information. For example, for the above disclosed method step for determining whether the above disclosed one or more radio signal parameters are expected or unexpected may be performed in a similar manner for the one or more previous radio signal parameters and the previous observation position instead of the one or more radio signal parameters and the observation position, respectively. For example, in the event that it is determined that the previous radio signal parameters are unexpected, it is also determined that the above disclosed one or more radio signals are unexpected as well, irrespective of whether or not the above disclosed one or more radio signals would be determined to be expected if taken alone. Alternatively or additionally, a matching algorithm used for determining whether the above disclosed one or more radio signal parameters are expected or unexpected may be adapted at least partially based on the result of the determining whether the one or more previous radio signal parameters are expected or unexpected, for example the matching algorithms may apply more strict matching parameters if it is/was determined that the one or more previous radio signal parameters are unexpected than if it is/was determined that the one or more previous radio signal parameters are expected. This way, assuming for example that the one or more radio signal parameters and the one or more previous radio signal parameters are manipulated, the one or more radio signal parameters would be determined to be unexpected by means of determining that the previous radio signal parameters are unexpected, even if the one or more radio signal parameter may otherwise be determined to be expected. For example, the manipulated one or more radio signal parameter may erroneously be determined to be expected if the one or more radio signal parameters have been manipulated in a highly realistic manner, implying that the manipulated one or more radio signal parameters match the expected radio environment indicated by the according radio map. However, it is unlikely that in addition to the manipulated one or more radio signal parameters, the previous one or more radio signal parameters have been manipulated in a highly realistic manner as well. Accordingly, it is unlikely that while the one or more radio signal parameters are erroneously determined to be expected, the previous one or more radio signal parameter are erroneously determined to be expected as well. It follows that this disclosed method additionally based on at least one of previous radio signal parameters, previous observation position and previous observation position information allows for identifying potentially manipulated radio signals and/or radio signal parameters in a more reliable and robust way.

Alternatively or additionally, the determining whether the above disclosed one or more radio signal parameters are expected or unexpected, may additionally be based on the sensor information. For example, estimates of the observation position and the previous observation position may be determined based on the radio map as disclosed above. Subsequently, it may then be determined whether the movement of the mobile device indicated by the sensor information matches to the estimates of the observation position and the previous observation position, for example by determining whether a distance between the estimates of the observation position and the previous observation position at substantially corresponds to a distance for which the movement of the mobile device indicated by the sensor information is characteristic. For example, if the sensor information represents a step count a typical step length may be predefined for determining such a characteristic distance by multiplying the typical step length with step count, and, of the sensor information represents an average speed, the characteristic distance may be determined by multiplying the average speed with the duration of the movement. For example, it may be predetermined that the one or more radio signal parameters and/or the one or more previous radio signal parameters are unexpected if the distance between the estimates of the observation position and the previous observation position at substantially is greater (e.g. substantially greater like more than 5% or more than 10% greater) than the distance for which the movement of the mobile device indicated by the sensor information is characteristic.

According to an exemplary embodiment of the invention the method further comprises one or more of the following, if it is determined that the one or more radio signal parameters are unexpected:

identifying or causing of identifying the one or more radio signals as potentially manipulated;

identifying or causing of identifying the one or more radio signal parameters as potentially manipulated;

rejecting the one or more radio signal parameters for estimating a position of the mobile device;

if a position of the mobile device is estimated at least partially based on the one or more radio signal parameters, identifying the estimated position as potentially manipulated.

As disclosed above, if it is determined that the one or more radio signal parameters are unexpected, the one or more radio signals and/or the one or more radio signal parameters may be considered to be potentially manipulated.

Identifying the one or more radio signals as potentially manipulated may be understood to mean that manipulation information identifying the one or more radio signals as potentially manipulated are stored (e.g. by the mobile device and/or a remote device like the positioning server). Causing of identifying the one or more radio signals as potentially manipulated may be understood to mean that manipulation information are provided (e.g. to the mobile device or to a remote device like the positioning server) causing the device receiving the manipulation information to identify the one or more radio signals as potentially manipulated.

Similarly, identifying the one or more radio signal parameters as potentially manipulated may be understood to mean that manipulation information identifying the one or more radio signal parameters as potentially manipulated are stored (e.g. by the mobile device and/or a remote device like a positioning server). Causing of identifying the one or more radio signal parameters as potentially manipulated may be understood to mean that manipulation information is provided (e.g. to the mobile device or to a remote device like a positioning server) causing the device receiving the manipulation information to identify the one or more radio signal parameters as potentially manipulated.

Identifying of radio signals and/or radio parameters as potentially manipulated may allow the mobile device and/or other devices to recognize radio signals and/or radio signal parameters which have already been considered as potentially manipulated before. For example, the mobile device or the remote device (e.g. the positioning server) may maintain a database (e.g. a black list) for storing (e.g. collecting) manipulation information identifying radio signals and/or radio signal parameters as potentially manipulated.

Rejecting the one or more radio signal parameters for estimating (e.g. determining) a position of the mobile device may be understood to mean that the rejected radio signal parameters are not used for estimating (e.g. determining) a position of the mobile device. In case the position of the mobile device is estimated (e.g. determined) by a remote device (e.g. a positioning server), the mobile device may provide manipulation information to the remote device causing the remote device to reject the one or more radio signal parameters for estimating (e.g. determining) a position of the mobile device. This has the effect that only radio signal parameters which are considered to be trustworthy (i.e. not potentially manipulated) are used for estimating (e.g. determining) a position of the mobile device.

Identifying an estimated (e.g. determined) position as potentially manipulated may be understood to mean that manipulation information identifying the estimated position as potentially manipulated are stored (e.g. by the mobile device or a remote device like a positioning server). For example, the manipulation information may be stored together or may be part of position information representing the estimated position (e.g. in the form of positioning coordinates). In case the position of the mobile device is estimated (e.g. determined) by a remote device (e.g. a positioning server), the mobile device may provide manipulation information to the remote device causing the remote device to identify the estimated (e.g. determined) position as potentially manipulated. By identifying the estimated position as potentially manipulated, the potential manipulation can be considered when further processing the estimated position. For example, business services or applications which rely on trustworthy positioning like car sharing services may not use estimated positions identified as potentially manipulated. Other business services or applications may however consider estimated position identified as potentially manipulated.

According to an exemplary embodiment of the invention the method further comprises one or more of the following, if it is determined that the one or more radio signal parameters are expected:

estimating (e.g. determining) or causing of estimating (e.g. determining) of a position of the mobile device at least partially based on the one or more radio signal parameters;

determining or causing of determining an update for the radio map at least partially based on the first radio signal parameters or the second radio signal parameters;

if a position of the mobile device is estimated (e.g. determined) at least partially based on the one or more radio signal parameters, identifying or causing of identifying the estimated position as trustworthy.

As disclosed above, if it is determined that the one or more radio signal parameters are expected, the one or more radio signal parameters may be considered to be trustworthy.

Estimating (e.g. determining) of a position of the mobile device at least partially based on radio signal parameters considered as trustworthy may have the effect that the estimated position may be considered as well as trustworthy.

For example, the one or more radio signal parameters may be part of radio fingerprint observation reports determined by the mobile device for determining an update for the radio map. As disclosed above, a radio map may be determined during the training stage of a non-GNSS based radio positioning system. For example, the mobile device may determine an update for the radio map (e.g. update the radio map) at least partially based on these radio fingerprint observation reports. Alternatively or additionally, the mobile device may provide these radio fingerprint observation reports to a remote device (e.g. the positioning server) to cause the remote device to determine the update for the radio map (e.g. update the radio map) at least partially based on these radio fingerprint observation reports. Determining an update for the radio map based on radio signal parameters considered as trustworthy may have the effect that the radio map may be considered as well as trustworthy.

Identifying an estimated (e.g. determined) position as trustworthy may be understood to mean that trust information identifying the estimated position as trustworthy are stored (e.g. by the mobile device or a remote device like the positioning server). For example, the trust information may be stored together or may be part of position information representing the estimated position (e.g. in the form of positioning coordinates). In case the position of the mobile device is estimated (e.g. determined) by a remote device (e.g. a positioning server), the mobile device may provide trust information to the remote device causing the remote device to identify the estimated (e.g. determined) position as trustworthy. By identifying the estimated position as trustworthy, the trustworthiness can be considered when further processing the estimated position. For example, business services or applications which rely on trustworthy positioning like car sharing services may only use estimated positions identified as trustworthy. Other business services or applications may however consider estimated positions even if they are not considered as trustworthy (e.g. potentially manipulated).

According to an exemplary embodiment of the invention the one or more radio signal parameters comprise or represent one or more of the following radio signal parameters:
an identifier of a radio signal;
a received signal strength parameter;
a signal-to-noise ratio parameter;
a signal quality parameter.

An identifier of a radio signal may be understood to mean information contained in an observable radio signal which is configured to enable identifying the radio signal and/or distinguishing the radio signal from other radio signals. An example for such an identifier of a radio signal is an identifier of a radio device transmitting the radio signal like a name, an address (e.g. a MAC address or an IP address), an universally unique identifier (UUID), a service set identifier (SSID), a basic service set identifier (BSSID), or a combination thereof. For example, the identifiers of the one or more radio signals may be obtained by extracting the identifiers from the one or more radio signals when scanning for observable radio signals at the observation position.

A signal quality parameter may be understood to mean information indicating the reception quality of an observable radio signal. Examples of such signal quality parameters are a received signal strength parameter and a signal-to-noise ratio parameter.

A received signal strength parameter may represent the receiving power of an observed radio signal. In other words, the received signal strength parameter may represent the receiving power of a radio signal observed by the mobile device when scanning for observable radio signals. For example, the mobile device may measure the receiving power of a radio signal observed by the mobile device when scanning for observable radio signals. An example, of a received signal strength parameter is a received signal strength indicator (RSSI) or a physical receiving power level (e.g. a Rx power level) in dBm.

A signal-to-noise ratio parameter may represent a ratio of the receiving power of an observed radio signal and the receiving power of observed background noise. For example, when scanning for observable radio signals, the mobile device may measure the receiving power of a radio signal observed by the mobile device and the receiving power of the background noise observed by the mobile device. An example, of a signal-to-noise ratio parameter is a value representing the ratio of the receiving power of an observed radio signal and the receiving power of observed background noise in dB.

According to an exemplary embodiment of the invention the one or more radio signals comprise one or more of the following radio signals:
a Bluetooth radio signal;
a Bluetooth Low Energy radio signal;
a WLAN radio signal;
an LPWAN radio signal;
a cellular radio signal.

Accordingly, the one or more radio devices transmitting (e.g. broadcasting) the one or more radio signals comprise one or more of the following radio devices:
a Bluetooth beacon (e.g. a Bluetooth beacon enabling Bluetooth low energy mode or a Bluetooth low energy beacon);
an access point of a wireless local area network;
an access point of a low-power wide area network; and
a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. A Bluetooth beacon that is employed for the invention may be any kind of Bluetooth beacon complying with any present or future standard. The Bluetooth standards are specified by the Bluetooth Special Interest Group and are presently available under www.bluetooth.com.

Such Bluetooth beacons may be easily installed as dedicated position support radio devices at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of 2 to 3 meters as well as a high reliability in floor detection may be achieved. The Bluetooth beacons may be stand-alone devices or be integrated into or attached to some other device. Bluetooth beacons, in particular in low energy mode, require comparably little energy and the use of Bluetooth low energy may enable a positioning with limited energy consumption at all involved devices.

It is to be understood, however, that other types of radio devices than variations of Bluetooth beacons may be used as well as dedicated position support radio devices, for instance tags or other devices that are configured to transmit ultra-wideband (UWB) signals or any wireless radio signals that might emerge in the future.

As disclosed above, existing radio devices like WLAN access points, LPWAN access points or cellular network nodes may be used as positioning support radio devices alternatively or additionally.

An LPWAN access point may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org.

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal. The 2G/3G/4G/5G cellular radio communication standards are developed by the 3GPP and presently available under www.3gpp.org.

According to an exemplary embodiment of the invention the radio map represents, for each radio device of a plurality of radio devices, a respective radio model.

A radio model may represent an estimate of a two-dimensional or a three-dimensional coverage map. It may describe (e.g. define) the expected radio coverage (e.g. an expected coverage area) of a radio device within which one or more radio signal parameters indicative of one or more radio signals transmitted by the radio device are expected to be observable. The real radio coverage of the radio device may however deviate from such an expected radio coverage. A radio signal may be understood to be observable at a specific position and/or in a specific area if the radio signal is receivable with a minimum quality (e.g. a minimum signal-to-noise ratio and/or a minimum signal power) at this specific position and/or within this specific area.

A radio model may be a hard-boundary model or a soft-boundary model.

An example for a soft-boundary radio model may be a parametric radio model. For example, such a parametric radio model may represent or comprise one or more radio transmission parameters (e.g. path-loss exponent and transmission power) characteristic for the expected propagation of one or more radio signals transmitted by a radio device. Using radio transmission parameters of the parametric radio model may have the effect that the required amount of data for defining the one or more characteristics of one or more radio signals may be particularly small. An example of a parametric radio model is a path loss model for radio signals transmitted or triggered to be transmitted by a radio device. In this case, the radio transmission parameters may comprise a path loss exponent and an indication of a transmission power used by the transmitter of the radio device. Based on the parametric radio model an expected radio coverage of a radio device may be determined.

Alternatively or additionally, a soft boundary radio model may be a radio image model representing an expected radio signal strength field of a radio signal transmitted or triggered to be transmitted by a radio device. An example of such a radio image model is a signal strength matrix model like a signal strength heatmap or a signal strength matrix.

An example for a hard-boundary radio model may be a geometric model. The radio model may be referred to as a geometric model of an expected radio coverage of a radio device if it is a geometric shape, such as for example a polygon, a rectangle and/or a square, a cuboid and/or a cube, an ellipse and/or a circle or an ellipsoid and/or a sphere. Using such geometric models representing the expected radio coverage of respective radio devices within the predetermined environment of the radio map has the effect that the radio model is very simple, only requires a small amount of data and is easy to analyze.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
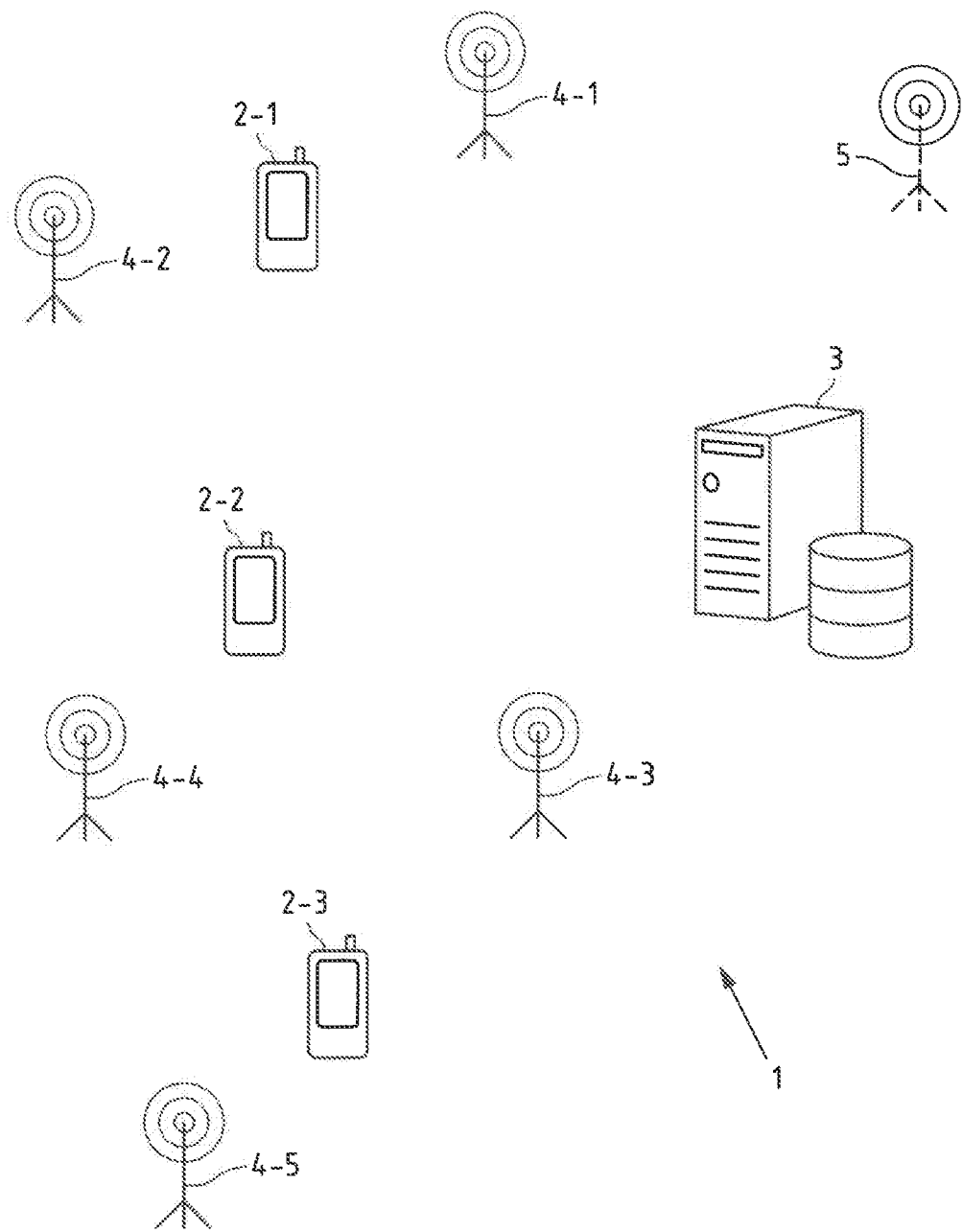
FIG. 1 is a block diagram of an exemplary embodiment of a system according to the invention.

FIG. 1 is a schematic high-level block diagram of a system 1 according to an exemplary aspect of the invention. For exemplary purposes and without limiting the scope of the invention, it is assumed in the following unless otherwise stated that system 1 is a non-GNSS based radio positioning system for a predetermined environment like a building or a complex of buildings (e.g. a shopping center, a parking garage, an airport, a company site, etc.).

For example, each of mobile devices 2-1 to 2-3 may be one of a smartphone, a tablet computer, a notebook computer, a smart watch, and a smart band.

Mobile devices 2-1 to 2-3 may be enabled for or support non-GNSS based radio positioning system 1.

System 1 comprises a positioning server 3 and a plurality of optional radio devices 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio devices 4-1 to 4-5 are radio devices in the form of BLE beacons 4-1 to 4-5 fixedly installed in the predetermined environment of system 1. However, system 1 may comprise further radio devices or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio devices 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio devices 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to estimate their position at least partially based on this radio map when the mobile devices are located within the predetermined environment of system 1 (i.e. the area covered by the radio map). Moreover, the radio map is indicative of an expected radio environment of the predetermined environment of system 1. As disclosed above, an expected radio environment at a certain position within the predetermined environment of system 1 may be understood to be indicative of one or more radio signals or one or more radio signal parameters of one or more radio signals that are expected to be observable at this position.

For example, the radio map may represent, for each position of a predetermined grid of positions within the predetermined environment of system 1, one or more respective radio signals or one or more respective radio signal parameters of one or more radio signals that are expected to be observable (e.g. obtainable as scanning results by a mobile device like one of mobile devices 2-1 to 2-3) at the respective position. To this end, the radio map of the predetermined environment of system 1 may contain or represent a respective radio model for each of BLE beacons 4-1 to 4-5. As disclosed above, a respective radio model for a respective BLE beacon of BLE beacons 4-1 to 4-5 may be understood to comprise or represent at least the expected radio coverage of the respective radio device. For example, the radio model of such a BLE beacon may at least describe the coverage area within which radio signals transmitted by this radio device and, thus, containing or representing an identifier like a UUID of this radio device are expected to be observable. Moreover, the radio model of such a BLE beacon may additionally represent, for each position of the predetermined grid of positions which is within the coverage area of the BLE beacon, the respective received signal strength of radio signals transmitted by this radio device that is expected to be observed (e.g. obtainable as scanning results) by a mobile device (e.g. one of mobile devices 2-1 to 2-3) when scanning for observable radio signals at the respective position of the plurality of positions. In the following, it is thus assumed that the radio map of the predetermined environment of system 1 represents, for each position of the predetermined grid of positions within the predetermined environment of system 1, the UUID(s) contained or represented by and the received signal strength value(s) of the one or more respective radio signals that are expected to be observable (e.g. obtainable as scanning results by a mobile device like one of mobile devices 2-1 to 2-3) at the respective position.

In the positioning stage, mobile devices 2-1 to 2-3 may use the radio map to determine their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 and 4-3 when scanning for observable radio signals at its present observation position, it may for example determine (e.g. estimate) by use of the radio map that its present observation position is within the overlapping region of the coverage areas described by the radio models of BLE beacons 4-1, 4-2 and 4-3.

As disclosed above, non GNSS-based radio positioning systems like system 1 may be affected by manipulating radio signals that are used for positioning purposes during the positioning stage. Manipulation techniques may for example be spoofing or jamming of such radio signals as disclosed above in more detail. For example, an attacker may install a spoofing radio device 5 in a certain area to deceive mobile devices 2-1 to 2-3 to cause them to determine to be located within the overlapping region of the coverage areas described by the radio models of BLE beacons 4-1, 4-2 an 4-3. The spoofing radio device 5 may be configured to (e.g. automatically and/or repeatedly) transmit spoofed BLE radio signals containing or representing the UUIDs of BLE beacons 4-1, 4-2 an 4-3. If mobile devices 2-1 to 2-3 determine their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

As disclosed in more detail below with respect to FIG. 5, this threat may be mitigated by the disclosed method.

Figure 2:
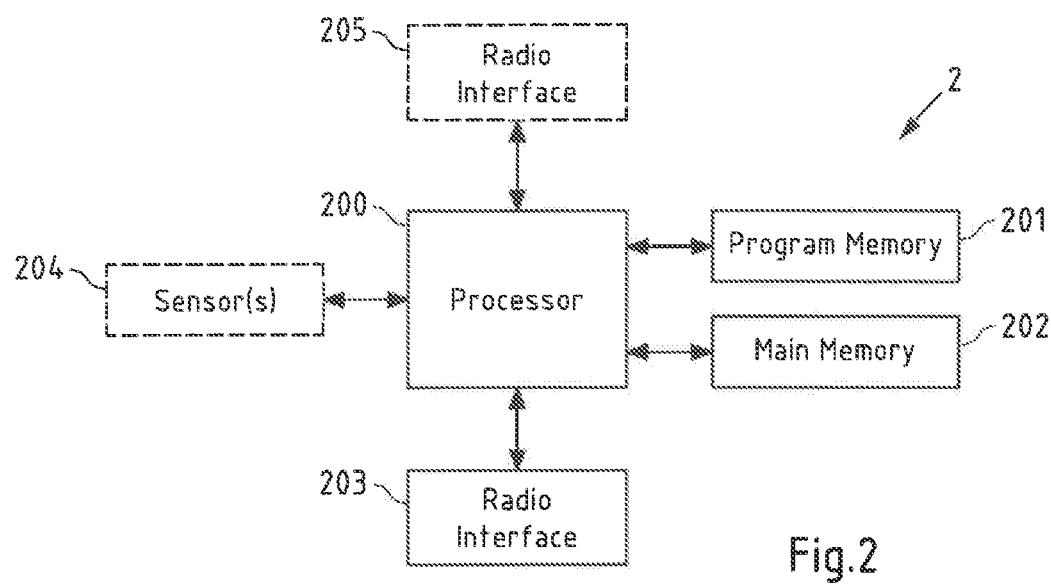
FIG. 2 is a block diagram of an exemplary embodiment of a mobile device according to the invention.

FIG. 2 is a block diagram of an exemplary embodiment of mobile device 2 according to the invention. In the following, it is assumed that mobile devices 2-1 to 2-3 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 5), when executed on processor 200), and interfaces with a main memory 202. Program memory 201 may also contain an operating system for processor 200 and radio map information representing a radio map of the predetermined environment of system 1. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a radio interface 203 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 203 is a BLE transceiver configured to transmit and receive BLE radio signals in line with any current or future version of the Bluetooth standard supporting a low energy mode. Radio interface 203 enables mobile device 2 to scan for observable BLE radio signals transmitted (e.g. broadcasted) by BLE beacons 4-1 to 4-5 of system 1. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 200, to determine one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 200 as scanning results. It is to be understood that any computer program code required for receiving and processing received BLE radio signals may be stored in an own memory of the radio interface 203 and executed by an own processor of the radio interface 203 or it may be stored for example in memory 202 and executed for example by processor 200.

Moreover, processor 200 controls one or more optional sensors 204. Examples of sensors 204 are a GNSS sensor (e.g. a GPS sensor and/or a Galileo sensor), an inertial or motion sensor (e.g. a speed sensor, an acceleration sensor, a shock sensor, an activity or step sensor, an orientation sensor like a compass or a gyroscope), an optical sensor (e.g. a camera), or a combination thereof. The determined sensor information may be provided to processor 200. For example, sensor information can be given in form of observation position information representing or comprising GNSS coordinates representing the observation position determined by the GNSS sensor of the mobile device. Additionally or alternatively, sensor information can be given in form of sensor information indicating (e.g. qualitatively or quantitatively) a movement of the mobile device. An event or change in the environment of mobile device 2 may for example be an event associated with or a change of a physical quantity (e.g. acceleration, orientation, shock, speed, etc.) that is characteristic for a movement of mobile device 2.

Processor 200 further controls an optional radio interface 205 configured to communicate via a cellular radio network (e.g. to transmit and receive cellular radio signals). For example, radio interface 205 may be or may comprise a 2G/3G/4G/5G radio transceiver. Mobile device 2 may use radio interface 205 to communicate with positioning server 3 of system 1 (e.g. via the internet). For example, mobile device 2 may use radio interface 205 to transmit radio fingerprint observation reports to positioning server 3 and/or receive radio map information from positioning server 3.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
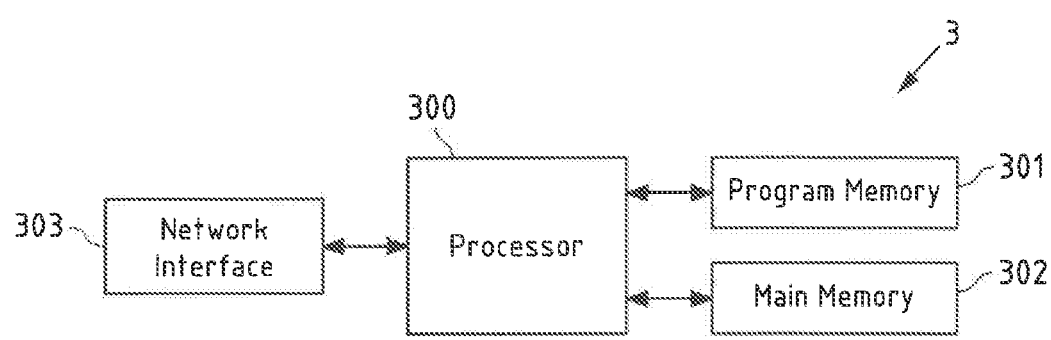
FIG. 3 is a block diagram of an exemplary embodiment of a positioning server according to the invention.

FIG. 3 is a block diagram of an exemplary embodiment of positioning server 3 according to the invention. In the following, it is assumed that positioning server 3 of system 1 of FIG. 1 corresponds to this positioning server 3.

Positioning server 3 comprises a processor 300. Processor 300 may represent a single processor or two or more processors, which are for instance at least partially coupled, for instance via a bus. Processor 300 executes a computer program code stored (e.g. computer program code causing positioning server 3 to determine a radio map of the predetermined environment of system 1 based on radio fingerprint observation reports collected by mobile devices like mobile devices 2-1 to 2-3) in program memory 301, and interfaces with a main memory 302. Program memory 301 may also contain an operating system for processor 300 and radio map information representing a radio map of the predetermined environment of system 1. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a network interface 303 which is configured to communicate via a communication network (e.g. the internet). Positioning server 3 may use network interface 303 to communicate with mobile devices 2-1 to 2-3 of FIG. 1 (e.g. via the internet). For example, positioning server 3 may use network interface 303 to receive radio fingerprint observation reports from mobile devices 2-1 to 2-3 and/or transmit radio map information to mobile devices 2-1 to 2-3.

The components 301 to 303 of positioning server 3 may for example be connected with processor 300 by means of one or more serial and/or parallel busses.

It is to be understood that positioning server 3 may comprise various other components like a user interface for receiving user input.

Figure 4:
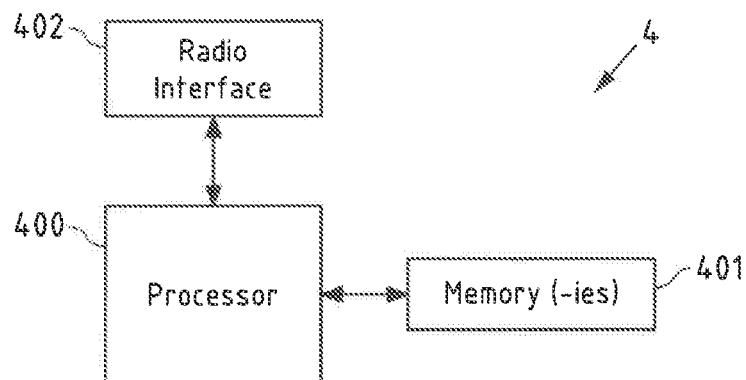
FIG. 4 is a block diagram of an exemplary embodiment of a radio device according to the invention.

FIG. 4 is a block diagram of an exemplary embodiment of a radio device 4 according to the invention. In the following, it is assumed that this radio device 4 is a BLE beacon and corresponds to BLE beacons 4-1 to 4-5 of system 1.

BLE beacon 4 comprises a processor 400. Processor 400 may represent a single processor or two or more processors, which are for instance at least partially coupled, for instance via a bus. Processor 400 executes a program code stored in memory(-ies) 401. Memory(-ies) 401 may also comprise an operating system for processor 400. Memory(-ies) 401 may for instance comprise a first memory portion that is fixedly installed in BLE beacon 4, and a second memory portion that is removable from beacon 4, for instance in the form of a removable SD memory card. Some or all of memory(ies) 401 may also be included into processor 400. Memory(ies) 401 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 400 when executing an operating system and/or computer program code.

Processor 400 further controls a radio interface 402 configured to receive and/or transmit BLE radio signals. For instance, radio interface 402 may at least comprise a BLE transmitter. The radio interface 402 may additionally comprise a BLE receiver. The transmitter and receiver may also be part of a BLE transceiver. The BLE transmitter enables BLE beacon 4 to transmit BLE radio signals in line with any current or future version of the Bluetooth standard supporting a low energy mode. For example, the BLE transmitter may be configured to automatically and repeatedly transmit BLE radio signals like an advertisement signal. As disclosed above in more detail, such a BLE radio signal may contain and/or represent positioning support information (e.g. a UUID of BLE beacon 4). Likewise, the BLE receiver enables BLE beacon 4 to receive BLE radio signals in line with any current or future version of the Bluetooth standard supporting a low energy mode.

The components 401 to 402 of BLE beacon 4 may for example be connected with processor 400 by means of one or more serial and/or parallel busses.

It is to be understood that BLE beacon 4 may comprise various other components.

Figure 5:
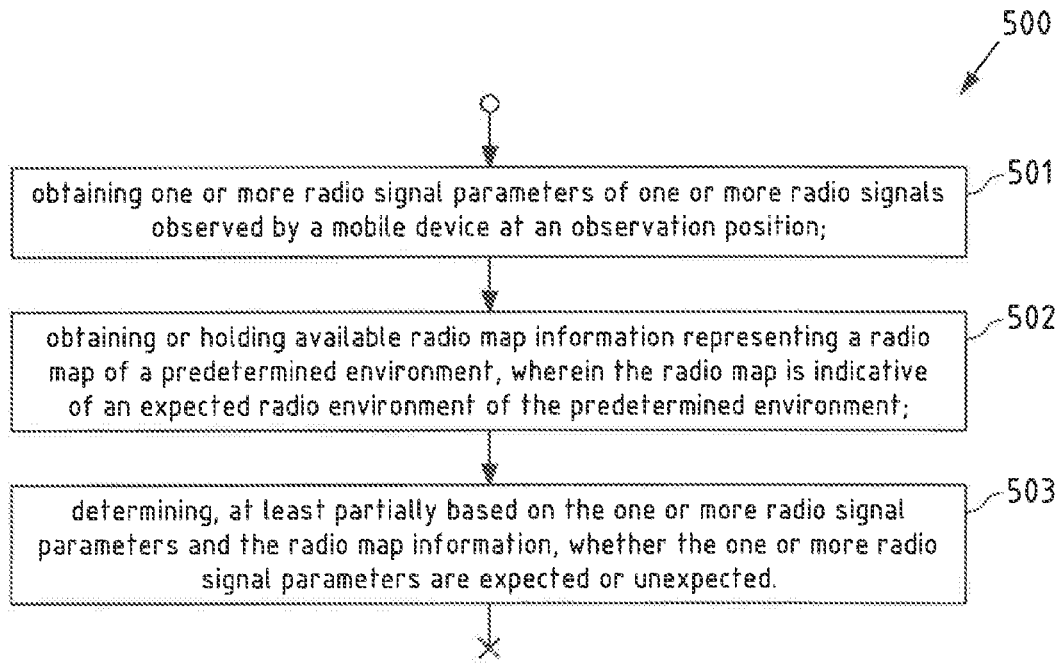
FIG. 5 is a flow chart illustrating an exemplary embodiment of a method according to the invention.

FIG. 5 is a flow chart 500 illustrating an exemplary embodiment of a method according to the invention. For exemplary purposes and without limiting the scope of the invention, it is assumed in the following that mobile device 2-1 as described above with respect to FIG. 1 performs the steps of flow chart 500.

In a step 501, one or more radio signal parameters of one or more radio signals observed by mobile device 2-1 at an observation position are obtained by mobile device 2-1.

As disclosed above in more detail, the one or more radio signal parameters may be obtained as scanning results from radio interface 203 when scanning for observable BLE radio signals at the observation position of mobile device 2-1 in step 501. In the following, it is assumed that the one or more radio signal parameters comprise or represent, for each observed BLE radio signal, a respective UUID and a respective received signal strength value.

In a step 502, radio map information representing a radio map of a predetermined environment are obtained or held available by mobile device 2-1, wherein the radio map is indicative of an expected radio environment of the predetermined environment.

For example, the radio map may be a radio map of the predetermined environment of system 1. As disclosed above, the radio map of the predetermined environment of system 1 may be represented by radio map information which may be provided (e.g. transmitted) by positioning server 3 to mobile device 2-1 and/or which may be held available by mobile device 2-1. For example, the radio map information representing the radio map of the predetermined environment of system 1 may be received from positioning server 2 by optional radio interface 205 in step 502 and subsequently stored in memory 201.

In a step 503, it is determined, at least partially based on the one or more radio signal parameters and the radio map information, whether the one or more radio signal parameters are expected or unexpected. The determining in step 503 may be performed according to predetermined rules (e.g. a predetermined algorithm). The predetermined rules may for example represent at least one of (1) a definition when the one or more radio signal parameters are to be determined to be expected at least partially based on the radio map information (e.g. the expected radio environment of the predetermined environment indicated by the radio map represented by the radio map information) and (2) a definition when the one or more radio signal parameters are to be determined to be unexpected at least partially based on the radio map information (e.g. the expected radio environment of the predetermined environment indicated by the radio map represented by the radio map information).

For example, the one or more radio signal parameters may be determined to be unexpected in step 503 if the one or more radio signals or the one or more radio signal parameters of the one or more radio signals are not expected to be observable (e.g. obtainable as scanning results) within the predetermined environment according to the expected radio environment indicated by the radio map represented by the radio map information. Otherwise, the one or more radio signal parameters may be defined to be expected.

To give a non-limiting example, the determining in step 503 may comprise:

determining whether the one or more radio signal parameters obtained in step 501 match the expected radio environment indicated by the radio map at one or more positions of the predetermined environment of system 1.

As disclosed above, the radio map of the predetermined environment of system 1 represents, for each position of the predetermined grid of positions within the predetermined environment of system 1, the UUID(s) contained or represented by and the received signal strength value(s) of the one or more respective radio signals that are expected to be observable (e.g. obtainable as scanning results by a mobile device like one of mobile devices 2-1 to 2-3) at the respective position. Accordingly, the determining whether the one or more radio signal parameters obtained in step 501 match the expected radio environment indicated by the radio map at one or more positions of the predetermined environment may be understood to mean that it is determined whether the one or more radio signal parameters are expected to be observable (e.g. obtainable as scanning results) at at least one position of the predetermined grid of positions within the predetermined environment of system 1 according to the expected radio environment indicated by the radio map. To this end, it may for example be determined, for each position of the of the predetermined grid of positions within the predetermined environment of system 1, whether there is a match between the UUID(s) and the received signal strength value(s) represented by or contained in the radio signal parameters obtained in step 501 and the respective UUID(s) and the respective received signal strength value(s) represented by the radio map for the respective position of the predetermined grid of positions within the predetermined environment of system 1. Therein, the determining whether there is a match may be performed according to a matching algorithm (e.g. comparing algorithm). As disclosed above, the matching algorithms may be configured to reduce the effect of uncertainties like measurements uncertainties.

Considering the above example of spoofing radio device 5, it is highly unlikely that, if the radio signal parameters obtained in step 501 are radio signal parameters of spoofed BLE radio signals transmitted by spoofing radio device 5, it is determined that there is a match between this radio signal parameters and the expected radio environment indicated by the radio map at one or more positions of the predetermined environment of system 1. In particular, the received signal strength value(s) represented by or contained in the radio signal parameters obtained in step 501 may be different from the received signal strength value(s) represented by the radio map for the positions of the predetermined grid of positions. The received signal strength of a radio signal is a function of the distance between the transmitter and the receiver which is different for each of the BLE signals transmitted by BLE beacons 4-1 to 4-3, because BLE beacons 4-1 to 4-3 are installed at different installation positions. However, it is similar for the spoofed BLE radio signals transmitted by spoofing radio device 5.

Accordingly, if it is determined that there is a match at at least one position (e.g. only at one position) of the predetermined environment of system 1, it may be determined in step 503 that the one or more radio signal parameters are expected. Otherwise, it may be determined that the one or more radio signal parameters are unexpected. Moreover, if it is determined that there is a match only at one position of the predetermined environment of system 1, this position may be used as an estimate for the respective observation position of mobile device 2-1.

It is to be understood that the orders of the steps of flowchart 500 is only exemplary and that the steps may also have a different order if possible. Furthermore, it is also possible that two or more steps may be performed in one step.

Figure 6:
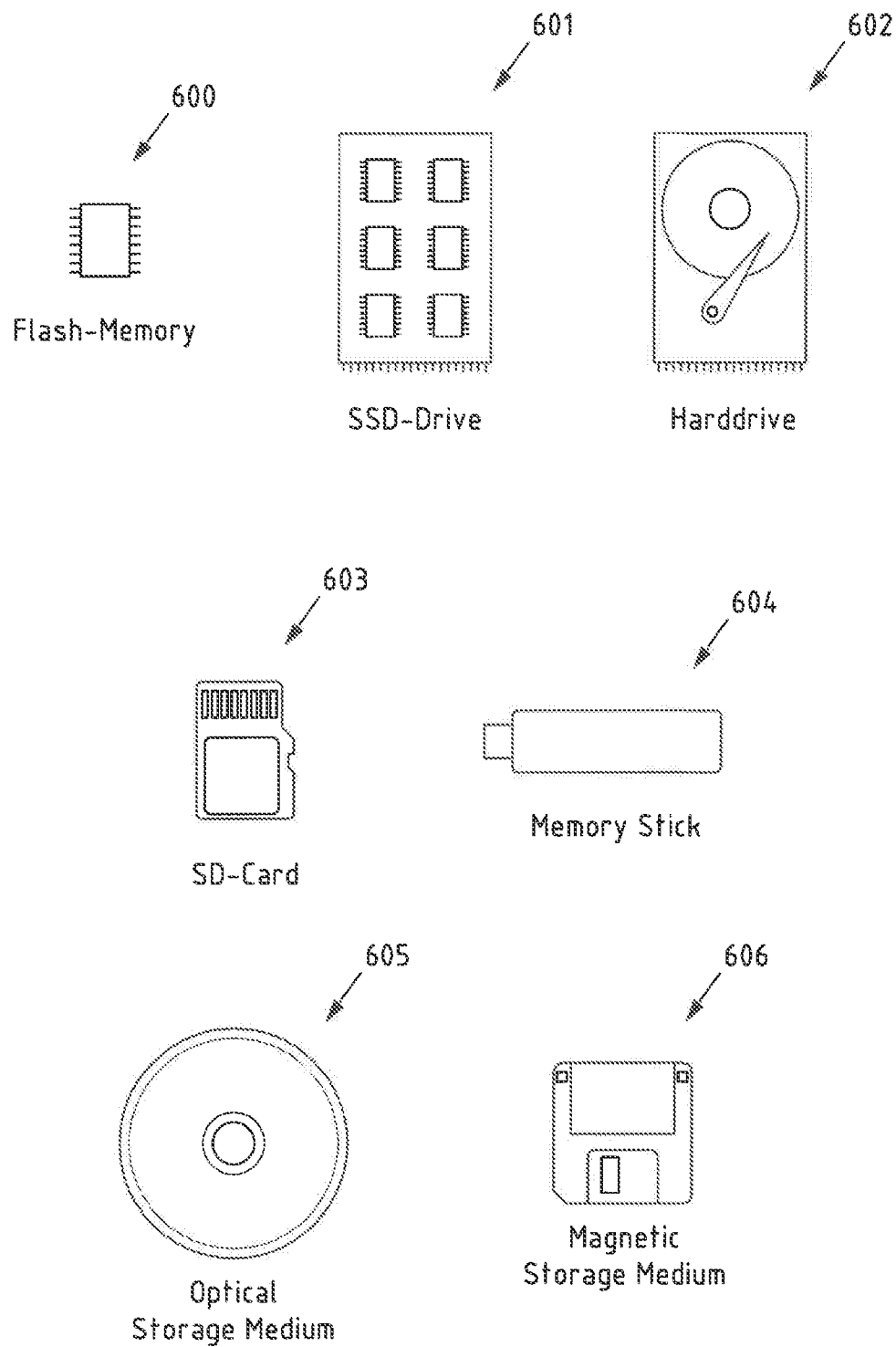
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 201 of FIG. 2, memory 301 of FIG. 3 and memory(-ies) 401 of FIG. 4. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function. Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method comprising:
   obtaining one or more radio signal parameters of one or more radio signals observed by a mobile device at an observation position;
   obtaining or holding available radio map information representing a radio map of a predetermined environment, wherein said radio map is indicative of an expected radio environment of said predetermined environment;
   determining an expected radio environment for said observation position based at least in part on the radio map information;
   comparing at least one of said one or more radio signal parameters to said expected radio environment for said observation position; and
   determining, based at least in part on a result of the comparing, whether said one or more radio signal parameters are unexpected.

2. The method according to claim 1, wherein said determining whether said one or more radio signal parameters are unexpected comprises:
   determining whether said one or more radio signal parameters match said expected radio environment indicated by said radio map at one or more positions of said predetermined environment or at said observation position.

3. The method according to claim 2, wherein when it is determined that said one or more radio signal parameters match said expected radio environment indicated by said radio map at least at one position of said predetermined environment or at said observation position, it is determined that said one or more radio signal parameter are not unexpected.

4. The method according to claim 2, wherein when it is determined that said one or more radio signal parameters do not match said expected radio environment indicated by said radio map at any position of said predetermined environment or at said observation position, it is determined that said one or more radio signal parameters are unexpected.

5. The method according to claim 1, wherein the method further comprises at least one of:

determining said observation position of said mobile device; or obtaining observation position information indicative of said observation position of said mobile device.

6. The method according to claim 1, wherein the method further comprises at least one of:
obtaining one or more previous radio signal parameters of one or more radio signals observed by said mobile device at a previous observation position;
determining said previous observation position of said mobile device;
obtaining previous observation position information indicative of said previous observation position of said mobile device; or
obtaining sensor information indicating a movement of said mobile device from said previous observation position to said observation position.

7. The method according to claim 6, wherein said determining whether said one or more radio signal parameters are unexpected is further based on at least one of said previous radio signal parameters, said previous observation position and said previous observation position information.

8. The method according to claim 1, wherein the method further comprises one or more of the following, when it is determined that said one or more radio signal parameters are unexpected:
identifying or causing of identifying said one or more radio signals as potentially manipulated;
identifying or causing of identifying said one or more radio signal parameters as potentially manipulated;
rejecting said one or more radio signal parameters for estimating a position of said mobile device; or
when a position of said mobile device is estimated at least partially based on said one or more radio signal parameters, identifying said estimated position as potentially manipulated.

9. The method according to claim 1, wherein the method further comprises one or more of the following, when it is determined that said one or more radio signal parameters are not unexpected:
estimating or causing of estimating of a position of said mobile device at least partially based on said one or more radio signal parameters;
determining or causing of determining an update for the radio map at least partially based on said first radio signal parameters or said second radio signal parameters; or
when a position of said mobile device is estimated at least partially based on said one or more radio signal parameters, identifying or causing of identifying said estimated position as trustworthy.

10. The method according to claim 1, wherein said one or more radio signal parameters comprise or represent one or more of the following radio signal parameters:
an identifier of a radio signal;
a received signal strength parameter;
a signal-to-noise ratio parameter; or
a signal quality parameter.

11. The method according to claim 1, wherein said one or more radio signals comprise one or more of the following radio signals:
a Bluetooth radio signal;
a Bluetooth Low Energy radio signal;
a wireless local area network (WLAN) radio signal;
a low-power wide-area network (LPWAN) radio signal; or
a cellular radio signal.

12. The method according to claim 1, wherein said radio map represents, for each radio device of a plurality of radio devices, a respective radio model, and wherein each of said radio models is one of a matrix model, a geometric model and a parametric model.

13. An apparatus comprising at least one processor and at least one memory including computer program code, the at least one memory and the computer program code configured to, with the at least one processor, cause said apparatus at least to:
obtain one or more radio signal parameters of one or more radio signals observed by a mobile device at an observation position;
obtain or hold available radio map information representing a radio map of a predetermined environment, wherein said radio map is indicative of an expected radio environment of said predetermined environment;
determine an expected radio environment for said observation position based at least in part on the radio map information;
compare at least one of said one or more radio signal parameters to said expected radio environment for said observation position; and
determine, based at least in part on a result of the comparing, whether said one or more radio signal parameters are unexpected.

14. The apparatus according to claim 13, wherein the at least one memory and the computer program code are configured to, with the at least one processor, cause said apparatus to determine whether said one or more radio signal parameters are unexpected by determining whether said one or more radio signal parameters match said expected radio environment indicated by said radio map at one or more positions of said predetermined environment or at said observation position.

15. The apparatus according to claim 14, wherein the at least one memory and the computer program code are configured to, with the at least one processor, cause said apparatus to, when it is determined that said one or more radio signal parameters match said expected radio environment indicated by said radio map at least at one position of said predetermined environment or at said observation position, determine that said one or more radio signal parameters are not unexpected.

16. The apparatus according to claim 14, wherein the at least one memory and the computer program code are configured to, with the at least one processor, cause said apparatus to, when it is determined that said one or more radio signal parameters do not match said expected radio environment indicated by said radio map at any position of said predetermined environment or at said observation position, determine that said one or more radio signal parameters are unexpected.

17. The apparatus according to claim 13, wherein the at least one memory and the computer program code are further configured to, with the at least one processor, cause said apparatus to perform at least one of:
obtaining one or more previous radio signal parameters of one or more radio signals observed by said mobile device at a previous observation position;
determining said previous observation position of said mobile device;
obtaining previous observation position information indicative of said previous observation position of said mobile device; or obtaining sensor information indicating a movement of said mobile device from said previous observation position to said observation position.

18. The apparatus according to claim 13, wherein the at least one memory and the computer program code are further configured to, with the at least one processor, cause said apparatus to perform one or more of the following, when it is determined that said one or more radio signal parameters are unexpected:
- identifying or causing of identifying said one or more radio signals as potentially manipulated;
- identifying or causing of identifying said one or more radio signal parameters as potentially manipulated;
- rejecting said one or more radio signal parameters for estimating a position of said mobile device; or
- when a position of said mobile device is estimated at least partially based on said one or more radio signal parameters, identifying said estimated position as potentially manipulated.

19. The apparatus according to claim 13, wherein the at least one memory and the computer program code are further configured to, with the at least one processor, cause said apparatus to perform one or more of the following, when it is determined that said one or more radio signal parameters are not unexpected:
- estimating or causing of estimating of a position of said mobile device at least partially based on said one or more radio signal parameters;
- determining or causing of determining an update for the radio map at least partially based on said first radio signal parameters or said second radio signal parameters; or
- when a position of said mobile device is estimated at least partially based on said one or more radio signal parameters, identifying or causing of identifying said estimated position as trustworthy.

20. A non-transitory computer-readable storage medium storing computer program code that is configured, upon execution, to:
- obtain one or more radio signal parameters of one or more radio signals observed by a mobile device at an observation position;
- obtain or hold available radio map information representing a radio map of a predetermined environment, wherein said radio map is indicative of an expected radio environment of said predetermined environment;
- determine an expected radio environment for said observation position based at least in part on the radio map information;
- compare at least one of said one or more radio signal parameters to said expected radio environment for said observation position; and
- determine, based at least in part on a result of the comparing, whether said one or more radio signal parameters are unexpected.

* * * * *